United States Patent [19]
Tsuboi et al.

[11] 3,944,776
[45] Mar. 16, 1976

[54] METHOD OF SUBMERGED ARC WELDING OF HIGH TENSION STEEL WORKPIECES

[76] Inventors: Junichiro Tsuboi, No. 483-14 Nitona-cho; Hisaei Terashima, No. 1, 1-Chome, Miyazaki-cho, both of Chiba, Japan

[22] Filed: Sept. 21, 1973

[21] Appl. No.: 399,402

Related U.S. Application Data

[63] Continuation-in-part of Ser. No. 224,469, Feb. 8, 1972, abandoned.

[30] Foreign Application Priority Data

Feb. 15, 1971 Japan.................................. 46-6393

[52] U.S. Cl................... 219/73; 148/24; 219/146
[51] Int. Cl.²...................... B23K 9/18; B23K 35/22
[58] Field of Search............ 148/24, 26; 219/73, 76, 219/137, 145, 146

[56] References Cited
UNITED STATES PATENTS

| | | | |
|---|---|---|---|
| 3,320,100 | 5/1967 | Coless.............................. | 219/73 X |
| 3,368,887 | 2/1968 | Enis................. | 219/145 X |
| 3,394,238 | 7/1968 | Wilcox.................................. | 219/73 |
| 3,501,354 | 3/1970 | De Long........................... | 148/26 X |
| 3,585,352 | 6/1971 | Zvanut................................ | 219/137 |
| 3,843,867 | 10/1974 | Helton et al..................... | 219/146 X |

*Primary Examiner*—Thomas J. Kozma
*Assistant Examiner*—N. D. Herkamp
*Attorney, Agent, or Firm*—Fleit & Jacobson

[57] ABSTRACT

Submerged arc welding of high tension steel workpieces by using bonded flux capable of generating at least 7 percent by weight of carbon dioxide gas during welding operation and producing slag with a basicity $B_L$ of not smaller than 1.0, in conjunction with a welding wire capable of providing alloying elements to weld metal, so as to produce weld metal having a high toughness and a high crack-resistivity.

4 Claims, 3 Drawing Figures

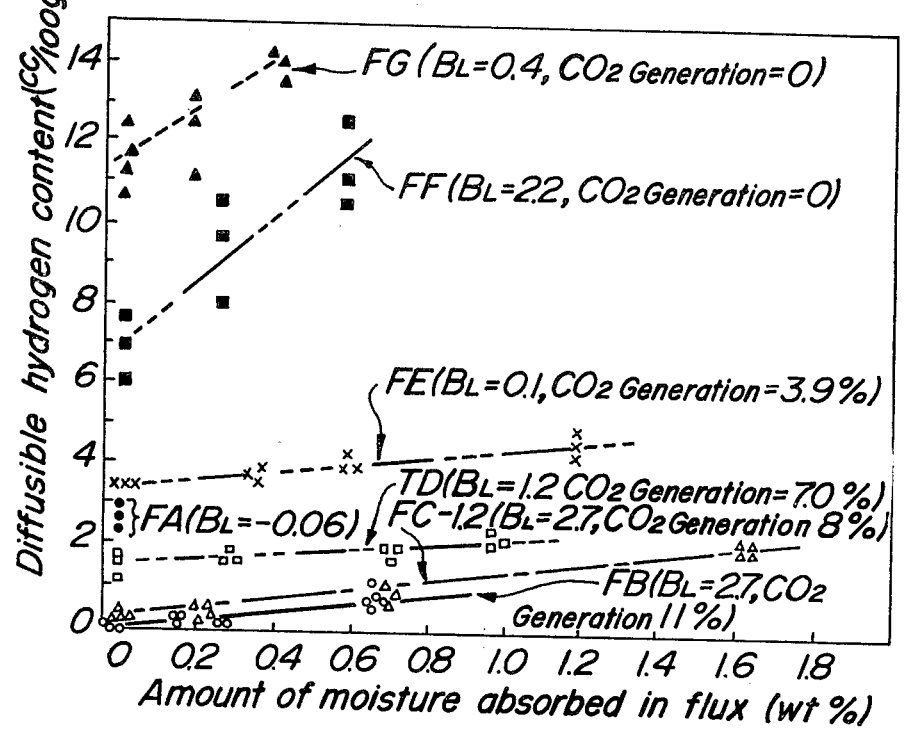

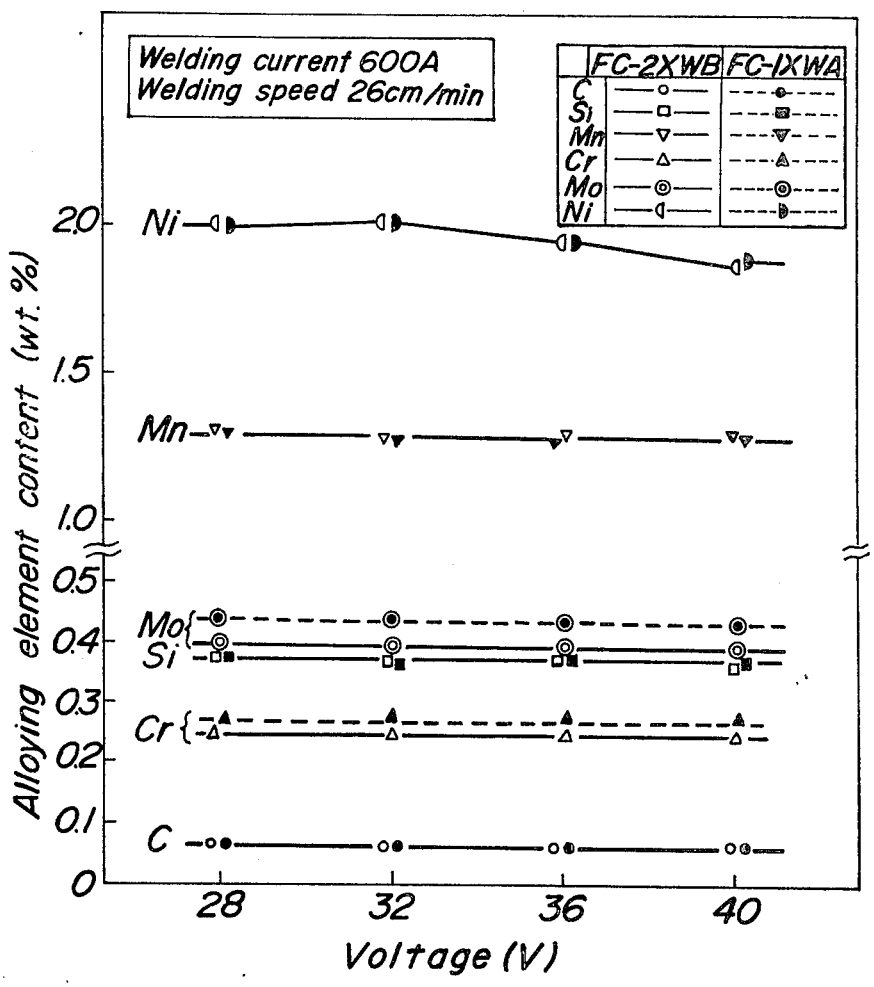

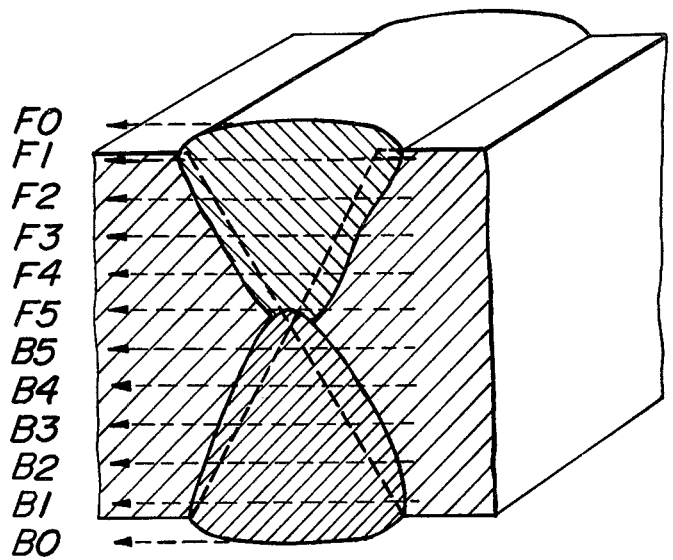
FIG_3

METHOD OF SUBMERGED ARC WELDING OF HIGH TENSION STEEL WORKPIECES

CROSS-REFERENCE TO RELATED APPLICATION

This application is a continuation-in-part of our application Ser. No. 224,469, filed Feb. 8, 1972, and entitled METHOD OF SUBMERGED ART WELDING OF HIGH TENSION STEEL WORKPIECES, now abandoned.

BACKGROUND OF THE INVENTION

1. Field of the Invention

This invention relates to a method of submerged arc welding of high tension steel workpieces, e.g., plates or like articles, and more particularly to a method of submerged arc welding of high tension steel plates or the like with a tensile strength of not smaller than 60 Kg/mm$^2$.

2. Description of Prior Art

In submerged arc welding of high tension steel workpieces, e.g., plates or the like, it is important to produce weld metal of high crack-resistivity. Conventional weld metal, which is produced by using fused flux, is not provided with sufficiently high crack-resistivity for welding high tension steel workpieces.

SUMMARY OF THE INVENTION

An object of the present invention is to provide a method of submerged arc welding of high tension steel plate or the like, by using a welding wire containing major alloying elements of desired weld metal, in conjunction with bonded flux containing a large amount of carbonate as a source of carbon dioxide and producing slag with a high basicity. With a combination of the aforesaid welding wire and the aforesaid bonded flux, one can produce a weld metal having a high toughness and a high crack-resistivity by reducing contents of oxygen, hydrogen, and sulfur in the weld metal. With conventional bonded flux, alloying elements of the weld metal tend to be segregated, and the alloy composition of the weld metal is apt to be varied depending on the welding conditions. The use of the aforesaid combination of the welding wire and the flux, according to the present invention, the risk of causing segregation and the composition fluctuation in response to the difference of welding conditions is almost completely eliminated.

When bonded flux is used in conventional submerged arc welding processes, it is intended to transfer most alloying elements directly from the flux to the weld metal. Accordingly, if a high content of any alloying element is required, such alloying element is apt to be segregated, and the composition of the weld metal produced thereby tends to fluctuate as welding conditions vary. As a result, a sizeable amount of the alloying elements may be wasted. The crack-resistivity of high tension steel at high temperature is very sensitive to the presence of the segregation and the non-uniformity therein. Accordingly, the bonded flux has seldom been used for submerged arc welding high tension steel workpieces. Furthermore, the bonded flux is generally hygroscopic, so that the bonded flux tends to increase the hydrogen content of the weld metal, resulting in cold cracks. In view of such physical and metallurgical properties, the bonded flux has not been considered as a material for submerged arc welding of high tension steel workpieces. Especially, for welding plates or like of high tension steel with a tensile strength of 70 to 80 Kg/mm$^2$, it has generally been believed preferable to use fused flux rather than bonded flux.

It has been well known that the toughness of the weld metal increases with the basicity of slag, provided that the alloy composition of the weld metal is constant. Such improvement of the toughness of the weld metal in response to the increase of the basicity of the slag is due to the fact that the oxygen content of the weld metal decreases as the slag basicity increases.

On the other hand, with the fused flux, it is impossible to provide a very high basicity to slag generated thereby, because the fused flux is required to have a low hygroscopicity for maintaining its vitrifiable properties. Due to the low basicity of its slag, the fused flux cannot produce a weld metal with a high toughness.

Despite its comparatively low hygroscopicity, fused flux does not necessarily have a very low hydrogen content, because the fused flux tends to absorb moisture from the atmosphere when it is fused during its manufacturing process, which moisture remains in the fused flux to raise its hydrogen content. Furthermore, it is impossible to add a shield gas generating agent in the fused flux, which agent is actuated during the welding operation. Thus, the low hygroscopicity of the fused flux does not necessarily result in a low hydrogen content of the weld metal.

It is true that submerged arc welding of high tension steel workpieces with a tensile strength of not smaller than 60 Kg/mm$^2$ has been performed by using fused flux, the quality of the weld metal obtained thereby has not been quite satisfactory.

In short, there is a pressing need for a submerged arc welding capable of generating weld metal having a high crack-resistivity as well as a high toughness.

Therefore, an object of the present invention is to provide a method for submerged arc welding high tension steel workpieces having tensile strength of not smaller than 60 Kg/mm$^2$, so as to meet the aforesaid need.

There are two basic factors for ensuring the soundness of the weld metal for bonding high tension steel workpieces by submerged arc welding; namely, notch toughness and crack-resistivity of weld metal.

According to the present invention, in order to satisfactorily meet the two factors, contents of oxygen and sulfur of the weld metal are reduced by using bonded flux producing slag having a high basicity. At the same time, the toughness of the weld metal is enhanced by adding chromium and molybdenum in the weld metal, as alloying elements thereof. The segregation of such alloying elements and diversity of the alloy composition of the weld metal due to the difference of welding conditions can be prevented by adding most of those alloying elements from a welding wire. According to the invention, the amount of carbon dioxide gas to be generated from the flux during the welding operation is so selected that the amount of hydrogen dissolved in the weld metal is minimized. It is known that the amount of hydrogen gas absorbed by slag increases with its basicity. Accordingly, the present invention produces slag with a high basicity, for minimizing the amount of hydrogen dissolved in the weld metal. Due to the synergistic effects of the aforesaid variety of approaches, weld metal with excellent toughness and crack-resistivity can be achieved by the method according to the present invention.

It is an important feature of the present invention that bonded flux is used for submerged arc welding high tension steel workpieces, despite its comparatively high hygroscopicity.

Bonded flux to be used in the submerged arc welding according to the present invention should generate at least 7 percent by weight of carbon dioxide gas, based on the total weight of the flux, during the welding operation, and generate slag having a basicity of not smaller than 1.0. An embodiment of such bonded flux essentially consists of up to 60 percent by weight of at least one compound selected from the group consisting of calcium carbonate ($CaCO_3$), magnesium carbonate ($MgCO_3$), barium carbonate ($BaCO_3$), sodium carbonate ($Na_2CO_3$), and manganese carbonate ($MnCO_3$), 4 to 16 percent by weight of silica ($SiO_2$), 8 to 24 percent by weight of alumina ($Al_2O_3$), and the remainder of calcium oxide (CaO) and/or magnesium oxide (MgO), which composition includes at least 7 percent by weight of carbon dioxide ($CO_2$) in the form of carbonate and produces slag having a basicity $B_L$ of not smaller than 1.0. The basicity $B_L$ is given by the following equation.

$$B_L = \sum_{i=1}^{n} a_i \cdot N_i$$

Here, $N_i$: molar fraction of ith oxide in the slag, $a_i$: a constant for the ith oxide, whose numerical value varies from oxide to oxide. Typical values for representative oxide are as follows.

| Oxide | $a_i$ |
|---|---|
| CaO | 6.05 |
| $SiO_2$ | −6.31 |
| $TiO_2$ | −4.97 |
| $Al_2O_3$ | −0.2 |
| MnO | 4.8 |
| MgO | 4.0 |
| FeO | 3.4 |

At least one carbonate, e.g., calcium carbonate and magnesium carbonate, is used for establishing the desired basicity of slag and as a source of carbon dioxide gas during the welding operation. If the content of such carbonate or carbonates in the bonded flux to be used in the submerged arc welding according to the present invention exceeds 60 percent by weight, workability of the flux may be jeopardized. The content of such carbonate or carbonates should be such that a sufficient amount of carbon dioxide gas ($CO_2$) is generated during the submerged arc welding process for effectively reducing the concentration of hydrogen dissolved in the weld metal generated by the submerged arc welding.

Silica, i.e., silicon dioxide, is used for ensuring workability of the bonded flux. If the addition quantity of silica is less than 4 percent by weight, desired improvement of the workability cannot be achieved, while if the addition quantity of silica exceeds 16 percent by weight, the basicity of slag is deteriorated.

The addition of more than 8 percent by weight of alumina acts to make the slag to be easily separable, while when the addition quantity of alumina exceeds 24 percent by weight, the workability of the flux is jeopardized.

The amount of carbonates in the bonded flux to be used in the submerged arc welding according to the present invention as a source of carbon dioxide gas should contain at least 7 percent by weight, preferably 8 to 11 percent by weight, of carbon dioxide, based on the total weight of the bonded flux. If the content of carbon dioxide is less than 7 percent by weight, the reduction of the amount of hydrogen dissolved in the weld metal becomes insufficient, and the desired improvement of the weld metal cannot be achieved.

It is an important factor to ensure the basicity $B_L$ of slag of not smaller than 1.0 by selecting a proper bonded flux composition. If the basicity of the slag turns out to be below 1.0, the desired quality of weld metal cannot be obtained.

The reason for the improvement of the toughness of weld metal by the method according to the present invention is as follows. During the welding operation, the bonded flux generates carbon dioxide gas, which carbon dioxide gas acts to reduce the partial pressure of water vapor in the space occupied by arc, so as to minimize the amount of moisture being dissolved in a molten pool of a weld metal. At the same time, slag with a high basicity is generated in the molten pool, which slag acts to absorb most of hydrogen dissolved in the molten pool of weld metal. Thus, the hydrogen content in the weld metal is minimized. The inventors have found that the bonded flux of the aforesaid composition also acts to greatly reduce contents of oxygen and sulfur of the weld metal. The reduction of the contents of hydrogen, oxygen, and sulfur results in a remarkable improvement of the toughness of the weld metal.

In order to achieve the aforesaid improvement of the weld metal, the bonded flux to be used in the submerged arc welding should contain carbonate capable of generating at least 7 percent by weight, preferably 8 to 11 percent by weight, of carbon dioxide gas, based on the total weight of the flux, and the basicity of the slag to be generated by the bonded flux should be above 1.0, preferably about 2.7. If either the carbon dioxide content or the basicity is reduced below the aforesaid lower limit thereof, the desired quality of the weld metal cannot be obtained.

With conventional submerged arc welding using bonded flux, it has been a practice to provide alloying elements to weld metal from the bonded flux. On the other hand, according to the present invention, most of the alloying elements of the weld metal are provided from a welding wire rather than from the bonded flux.

It should be noted here that, in the case of welding high tension steel workpieces, considerable amounts of alloying elements are necessary in the weld metal, and even a slight deviation of the alloy composition from a proper range and segregation of the alloying elements tend to cause cracks in the weld metal. The provision of the alloying elements from the welding wire, according to the submerged arc welding of the present invention, can prevent such deviation of the alloy composition of the weld metal and the segregation of the alloying elements.

According to the result of various tests carried out by the inventors, the bonded flux to be used in the submerged arc welding of the invention may contain certain amounts of alloying elements without causing any alloy composition deviation and segregation of such alloying elements: namely, based on the total weight of the bonded flux, less than 2.5 percent by weight of silicon, less than 4 percent by weight of manganese, less than 2 percent by weight of nickel, less than 0.2 percent by weight of chromium, less than 0.2 percent by weight of molybdenum, less than 0.6 percent by weight of copper, less than 0.01 percent by weight of titanium, less than 0.1 percent by weight of aluminum, less than 0.1 percent by weight of vanadium, and/or 0.04 percent by weight of niobium.

It should be noted that if any one of the aforesaid alloying elements is added in the bonded flux in excess of the aforelisted limit thereof, the crack-resistivity of the weld metal may gravely be deteriorated.

In order to provide a high toughness to the weld metal, the following alloying elements should preferably be added in the weld metal at the specified concentrations.

| | |
|---|---|
| Carbon | 0.04 to 0.07 percent by weight |
| Silicon | 0.2 to 0.8 percent by weight |
| Manganese | 1 to 1.8 percent by weight |
| Molybdenum | 0.15 to 0.90 percent by weight |
| Chromium | 0.1 to 1.5 percent by weight |
| Nickel | 0.1 to 3.5 percent by weight |

Carbon content in short of 0.04 percent by weight results in an excessive reduction of weld metal elongation, while carbon content greater than 0.07 percent by weight tends to make the weld metal brittle.

Silicon content in short of 0.2 percent by weight results in an insufficient de-oxydation of the weld metal, causing voids in it, while silicon content greater than 0.8 percent by weight tends to make the weld metal brittle.

Manganese content in short of 1 percent by weight results in an insufficient strength of the weld metal, while manganese content greater than 1.8 percent by weight tends to make the weld metal brittle.

Molybdenum content in short of 0.15 percent by weight results in an insufficient strength of the weld metal, while molybdenum content greater than 0.9 percent by weight tends to make the weld metal brittle.

Chromium content in short of 0.1 percent by weight does not improve physical properties of the weld metal, while chromium content greater than 1.5 percent by weight tends to make the weld metal brittle.

Nickel content in short of 0.1 percent by weight results in an insufficient toughness of the weld metal, while nickel content greater than 3.5 percent by weight may cause cracks in the weld metal.

With the submerged arc welding, according to the present invention, the aforesaid alloying elements are mostly provided from a welding wire to the weld metal, as pointed out in the foregoing. To this end, the welding wire to be used in the submerged arc welding according to the present invention essentially consists of 0.3 to 1.4 percent by weight of silicon, 0.3 to 3 percent by weight of manganese, 0.1 to 1.7 percent by weight of chromium, 0.1 to 1.1 percent by weight of molybdenum, and substantially the remainder of iron. The welding wire may further contain one or more of auxiliary alloying elements selected from the group consisting of less than 3.8 percent by weight of nickel, less than 0.6 percent by weight of copper, less than 0.05 percent by weight of titanium, less than 0.2 percent by weight of aluminum, 0.2 percent by weight of vanadium, and 0.03 percent by weight of niobium.

It should be noted here that, for certain high tension steel workpieces with a tensile strength of 60 Kg/mm$^2$ or larger, nickel may be provided to the weld metal from the workpieces being welded. In this case, a welding wire which does not contain nickel may be used for submerged arc welding of such workpieces.

The aforesaid auxiliary alloying elements may be added to the material of the welding wire by alloying or other suitable means, so as to coexist with the indispensable ingredients of the welding wire. The addition quantities of the auxiliary alloying elements in the welding wire are so selected as to provide the aforesaid preferable alloy composition of the weld metal.

BRIEF DESCRIPTION OF THE DRAWING

For a better understanding of the invention, reference is made to the accompanying drawings, in which:

FIG. 1 is a graph showing the relation between the amount of moisture absorbed by different bonded fluxes and diffusible hydrogen content of weld metal obtained by using such bonded fluxes;

FIG. 2 is a graph showing stability of the alloy composition of weld metal to be produced by submerged arc welding according to the present invention, illustrating the composition stability regardless of the magnitude of arc voltage; and FIG. 3 is a schematic sectional view, illustrating test locations of window type restrained weld cracking tests.

DESCRIPTION OF PREFERRED EMBODIMENT

The invention will now be described in further detail, by referring to examples.

Different bonded fluxes were prepared as shown in Table 1, including a conventional flux FA, fluxes according to the present invention FB, FC-1, FC-2, FD, and reference fluxes FE, FF, FG. Tests were made on content of diffusible hydrogen in weld metal, in accordance with the stipulations of Japanese Industrial Standard JIS Z 3113-1961. The results are shown in FIG. 1. As apparent from the figure, the fluxes according to the present invention can suppress the diffusible hydrogen content in the weld metal to a fraction of the produced by using conventional fluxes. Such suppression of the diffusible hydrogen content in the weld metal is particularly remarkable when the fluxes are moistened.

Two welding wires WA and WB according to the present invention and one reference welding wire WC were prepared, as shown in Table 2. Submerged arc welding of high tension steel workpieces was conducted by using the welding wires of Table 2 and the bonded fluxes of Table 1, with the following combinations.

The flux FC-1 and the welding wire WA (to be referred to as FC-1×WA)

The flux FC-2 and the welding wire WB (to be referred to as FC-2×WB)

The flux FA and the welding wire WC (to be referred to as FA×WC)

The chemical composition and the mechanical strengths of weld metals thus obtained were tested, and the results are shown in Tables 3 and 4, respectively.

Table 1

| Ingredients | Conventional flux FA | Fluxes of the invention | | | Reference fluxes | | | |
|---|---|---|---|---|---|---|---|---|
| | | FB | FC-1 | FC-2 | FD | FE | FF | FG |
| SiO$_2$ | 39.9 | 6.9 | 8.2 | 8.2 | 13.1 | 30.1 | 5.0 | 28.8 |
| MgO | 4.1 | 22.1 | 23.9 | 24.0 | 15.8 | 18.2 | 25.9 | 15.9 |
| CaO | 18.2 | — | 6.1 | 6.1 | 8.1 | 7.9 | 4.1 | 17.9 |
| CaCO$_3$ | — | 24.9 | 18.1 | 18.1 | 16.1 | 8.9 | — | — |
| CaF$_2$ | 7.8 | 11.9 | 11.9 | 11.9 | 4.6 | 4.9 | 15.0 | 4.1 |
| Al$_2$O$_3$ | 1.7 | 18.2 | 17.6 | 17.7 | 22.2 | 16.8 | 21.7 | 18.7 |
| TiO$_2$ | 3.8 | 5.0 | 4.9 | 4.9 | 9.8 | 5.3 | 11.3 | 4.2 |
| ZrO$_2$ | — | 7.2 | 9.3 | 9.4 | 10.8 | 4.2 | 12.8 | 5.7 |
| MnO | 19.9 | — | — | — | — | — | — | — |
| Si | — | 0.91 | 1.64 | — | 0.91 | 0.80 | 0.93 | 0.81 |
| Mn | — | 1.82 | 2.13 | — | 1.62 | 1.51 | 1.54 | 1.48 |
| Cr | — | — | 0.12 | — | — | — | — | — |
| Mo | — | — | 0.11 | — | — | — | — | — |

Table 2

| Welding wires | | Chemical composition (%) | | | | | | | | |
|---|---|---|---|---|---|---|---|---|---|---|
| | | Carbon | Silicon | Manganese | Phosphorus | Sulfur | Nickel | Chromium | Molybdenum | Iron |
| The invention | WA | 0.08 | 0.33 | 1.12 | 0.011 | 0.010 | 2.30 | 0.21 | 0.38 | Balance |
| | WB | 0.08 | 0.49 | 1.98 | 0.011 | 0.010 | 2.32 | 0.26 | 0.41 | " |
| Conventional | WC | 0.08 | 0.33 | 1.42 | 0.011 | 0.009 | 2.50 | 0.30 | 0.40 | " |

Table 3

| Weld metal made by | | Weld metal composition | | | | | | | | |
|---|---|---|---|---|---|---|---|---|---|---|
| | | Carbon (%) | Silicon (%) | Manganese (%) | Phosphorus (%) | Sulfur (%) | Nickel (%) | Chromium (%) | Molybdenum (%) | Oxygen (PPM) |
| The invention | FC-1×WA | 0.06 | 0.38 | 1.30 | 0.012 | 0.005 | 2.01 | 0.28 | 0.44 | 250 |
| | FC-2×WB | 0.06 | 0.36 | 1.28 | 0.012 | 0.005 | 2.02 | 0.26 | 0.39 | 240 |
| Conventional | FA×WC | 0.06 | 0.36 | 1.26 | 0.012 | 0.012 | 2.00 | 0.26 | 0.39 | 610 |

Table 4

| Weld metal made by | | Mechanical properties of weld metal | | | | | | |
|---|---|---|---|---|---|---|---|---|
| | | Yield point (Kg/mm$^2$) | Tensile strength (Kg/mm$^2$) | Elongation (%) | Reduction area (%) | Impact value (Kg.m/cm$^2$) | | |
| | | | | | | 0°C | −15°C | −40°C |
| The invention | FC-1×WA | 66.4 | 77.8 | 27 | 67 | 22.4 | 20.2 | 12.2 |
| | FC-2×WA | 64.8 | 76.6 | 26 | 68 | 21.6 | 20.6 | 12.4 |
| Conventional | FB×WC | 64.1 | 76.1 | 20 | 55 | 7.2 | 6.6 | 4.8 |

Table 5

Number of cracks in window type restrained weld cracking test

| Test positions | | | Weld metal | | |
|---|---|---|---|---|---|
| | | | Conventional | The invention | |
| | | | FA×WC (Moisture absorption 0%) | FC-1×WA (Moisture absorption 1.62%) | FC-2×WB (Moisture absorption 1.62%) |
| FO | Finishing surface | | 4, 20 to 40 mm | 0 | 0 |
| F1 | From | 2 mm | 4, 20 to 40 mm | 0 | 0 |

Table 5-continued

Number of cracks in window type restrained weld cracking test

| | Test positions | | | Weld metal | | |
|---|---|---|---|---|---|---|
| | | | | Conventional | The invention | |
| | | | | FA×WC (Moisture absorption 0%) | FC-1×WA (Moisture absorption 1.62%) | FC-2×WB (Moisture absorption 1.62%) |
| Location in FIG. 3 | F2 | finishing surface | 7 mm | Many | 0 | 0 |
| | F3 | | 12 mm | Many | 0 | 0 |
| | F4 | | 17 mm | Many | 0 | 0 |
| | F5 | | 22 mm | Many | 0 | 0 |
| | B5 | | 22 mm | 4, 20 to 40 mm | 0 | 0 |
| | B4 | From backing surface | 17 mm | 5, 10 to 40 mm | 0 | 0 |
| | B3 | | 12 mm | 4, 10 to 40 mm | 0 | 0 |
| | B2 | | 7 mm | 1, 10 mm | 0 | 0 |
| | B1 | | 2 mm | 0 | 0 | 0 |
| | B0 | Backing surface | | 0 | 0 | 0 |

Welding conditions:
Current 650 Amperes
Arc voltage 35 volts
Welding velocity 30 cm/minute
Welding thermal input 45,500 Joules/cm/pass
Interlayer temperature 100°C to 200°C As apparent from Table 4, the mechanical strengths of the weld metals obtained by the submerged arc welding according to the present invention (FC-1×WA and FC-2×WB), especially their impact values, are considerably improved, as compared with the corresponding mechanical strengths of the conventional weld metal (FA×WC).

FIG. 2 shows the variation of the alloy composition, or alloying element concentrations, of the two weld metals (FC-1×WA and FC-2×WB) obtained by the submerged arc welding of the present invention, in response to the variation of the arc voltage during the welding operation. It is apparent from the figure that the alloy composition of the weld metals to be obtained by the submerged arc welding according to the present invention is remarkably stable, regardless of the arc voltage fluctuation during the welding operation.

Window type restrained weld cracking tests were carried out on the two weld metals (FC-1×WA and FC-2×WB) obtained by the submerged arc welding of the present invention and one conventional weld metal (FA×WC). Workpieces for the tests were made of 50 mm-thick high tension steel plates having a tensile strength of 70 Kg/mm², which contained 0.15 percent by weight of carbon 0.26 percent by weight of silicon, 0.94 percent by weight of manganese, 0.01 percent by weight of phosphorus, 0.01 percent by weight of sulfur, 0.81 percent by weight of nickel, 0.51 percent by weight of chromium, 0.42 percent by weight of molybdenum, and 0.21 percent by weight of copper. The results are shown in Table 5. As apparent from Table 5, the crack-resistivity of the weld metals obtained by the method of the present invention is greatly improved over that of the conventional weld metal.

What is claimed is:
1. A method of submerged arc welding a workpiece of high tension steel with a tensile strength of at least 60 Kg/mm², comprising the steps of
covering a weld joint of the workpiece with bonded flux containing carbonate capable of generating at least 7 percent by weight of carbon dioxide gas, based on the total weight of the flux, during the welding operation and producing slag with a basicity of not smaller than 1.0;
placing a welding wire in the proximity of said weld joint through said flux, said welding wire consisting essentially of 0.3 to 1.4 percent by weight of silicon, 0.3 to 3 percent by weight of manganese, 0.1 to 1.7 percent by weight of chromium, 0.1 to 1.10 percent by weight of molybdenum, and substantially the remainder of iron;
applying a welding voltage to the welding wire so as to feed a welding current to said weld joint through said welding wire while moving said welding wire relative to said weld joint, so as to generate high tension weld metal in the weld joint by submerged arc welding having a high toughness and a high crack resistivity;
said carbon dioxide gas and said slag with a basicity of not smaller than 1.0 being provided by forming said bonded flux with up to 60 percent by weight of at least one carbonate selected from the group consisting of calcium carbonate, magnesium carbonate, sodium carbonate, barium carbonate, manganese carbonate, 4 to 16 percent by weight of silicon dioxide, 8 to 24 percent by weight of alumina, and the remainder of at least one compound selected from the group consisting of calcium oxide and magnesium oxide;
said weld metal consisting essentially of 0.04 to 0.07 percent by weight of carbon, 0.2 to 0.8 percent by weight of silicon, 1 to 1.8 percent by weight of manganese, 0.15 to 0.9 percent by weight of molybdenum, 0.1 to 1.5 percent by weight of chromium, 0.1 to 3.5 percent by weight of nickel, and substantially the remainder of iron, the steel of said workpiece containing 0.06 to 0.25 percent by weight of carbon, 0.01 to 0.55 percent by weight of silicon, 0.40 to 1.60 percent by weight of manganese, 0.01 to 0.50 percent by weight of copper, 0.01 to 2.50 percent by weight of nickel, 0.01 to 1.50 percent by weight of chromium, less than 1.00 percent by weight of molybdenum, 0.01 to 0.09 percent by weight of aluminum, less than 0.15 percent by weight of vanadium, less than 0.005 percent by weight of boron, less than 0.10 percent by weight of titanium, and less than 0.05 percent by weight of niobium.

2. Method according to claim 1, wherein alloying elements of said weld metal are partly provided from said bonded flux by adding auxiliary ingredients in said bonded flux, said auxiliary ingredients being at least one element selected from the group consisting of less than 2.5 percent by weight of silicon, less than 4 percent by weight of manganese, less than 2 percent by weight of nickel, less than 0.2 percent by weight of chromium, less than 0.2 percent by weight of molybdenum, less than 0.6 percent by weight of copper, less than 0.01 percent by weight of titanium, less than 0.1 percent by weight of aluminum, less than 0.1 percent by weight of vanadium, and less than 0.04 percent by weight of niobium.

3. Method according to claim 1, wherein additional alloying elements are provided in said weld metal by adding auxiliary ingredients in said welding wire, said auxiliary ingredients being at least one element selected from the group consisting of less than 3.8 percent by weight of nickel, less than 0.6 percent by weight of copper, less than 0.05 percent by weight of titanium, less than 0.2 percent by weight of aluminum, less than 0.2 percent by weight of vanadium, and less than 0.03 percent by weight of niobium.

4. Method according to claim 1, wherein alloying elements of said weld metal are additionally provided from said flux and said welding wire by adding first auxiliary elements in said flux and second auxiliary elements in said welding wire; said first auxiliary elements being at least one element selected from the group consisting of less than 2.5 percent by weight of silicon, less than 4 percent by weight of manganese, less than 2 percent by weight of nickel, less than 0.2 percent by weight of chromium, less than 0.2 percent by weight of molybdenum, less than 0.6 percent by weight of copper, less than 0.01 percent by weight of titanium, less than 0.1 percent by weight of aluminum, less than 0.1 percent by weight of vanadium, and less than 0.04 percent by weight of niobium, said second auxiliary elements being at least one element selected from the group consisting of less than 3.8 percent by weight of nickel, less than 0.6 percent by weight of copper, less than 0.05 percent by weight of titanium, less than 0.2 percent by weight of aluminum, less than 0.2 percent by weight of vanadium, and less than 0.03 percent by weight of niobium.

* * * * *